Aug. 21, 1962   M. COMANOR   3,050,576
BATTERY STRUCTURE

Filed April 6, 1959   2 Sheets-Sheet 1

INVENTOR:
MILTON COMANOR

BY
AGENT

United States Patent Office 3,050,576
Patented Aug. 21, 1962

3,050,576
BATTERY STRUCTURE
Milton Comanor, New York, N.Y., assignor to Yardney International Corp., New York, N.Y., a corporation of New York
Filed Apr. 6, 1959, Ser. No. 804,469
12 Claims. (Cl. 136—6)

The present invention relates to electrochemical cells and more particularly to the assembly of such cells in a battery.

An important field of use for electrical batteries is their function as sources of constant potential for the biasing circuits of electronic amplifiers and the like. As long as these sources are called upon to deliver only small currents, e.g. of less than 0.01 ampere-hour per day, it is expedient to supply such voltages from series-connected dry cells of conventional design. With the recent advent of transistors and other solid-state elements drawing relatively large biasing currents, however, it has been necessary to search for more powerful and preferably rechargeable electrochemical systems capable of delivering stable voltages of the required magnitudes.

It is an object of this invention to provide a compact, easily fabricated multiple-cell structure for the purpose described.

It is another object of this invention to provide a method of more efficiently manufacturing an array of cells which lends itself to series connection into batteries of desired potential.

In accordance with this invention a plurality of cells are enclosed in a plastic body, preferably in the form of an elongated strip, provided originally with suitable cavities each adapted to receive the electrode assembly of a respective cell. The cells, interconnected in series, parallel or any desired combination thereof by means of leads extending within or without the plastic body, are advantageously disposed side-by-side so that a flat, narrow matrix is obtained which could also be made flexible and can readily be fitted into small, even curved, spaces.

The invention will be more fully disclosed in connection with the accompanying drawing in which.

Figure 1:
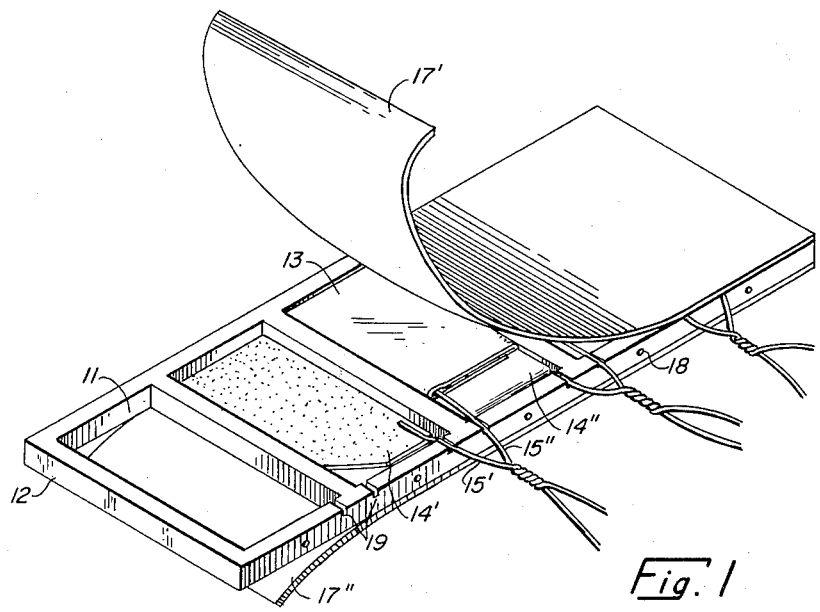
FIG. 1 is a perspective view showing one embodiment of a battery assembly according to this invention.
Figure 2:
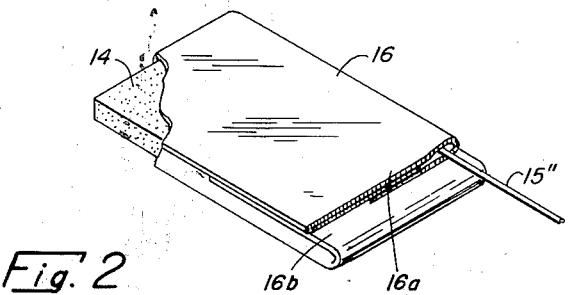
FIG. 2 is a perspective view of an electrode package forming part of the assembly of FIG. 1.

The embodiment shown in FIGS. 1 and 2 comprises a strip 12 of electrolyte-resistant, electrochemically inactive material having a plurality of cavities 11 punched or otherwise formed therein. The cavities 11 contain respective cells 13, each consisting of a positive electrode 14' with associated terminal lead 15', a negative electrode 14'' with associated terminal lead 15'', and an inter-electrode separator 16 surrounding at least one electrode to prevent electronic conduction with the opposite electrode.

The cells 13 are confined in the cavities 11 by cover sheets 17' and 17'' cemented or fused to the top and bottom surfaces of the framing strip member 12. The leads 15' and 15'' extend outwardly from the cell cavities 11 through the seals between the covers and the grooves 19 which are formed in the strip 12 and surrounded by the top sheet 17'. These leads are joined with the leads extending from adjacent cells in series or parallel connections to form a battery.

It should be noted that the choice of material for the framing members and the cover members is limited only by its need for ohmic resistance to the stored electricity and its chemical resistance to the active material of the cells including the electrolyte.

The electrodes may contain a variety of electrochemically active materials forming reversible couples. Of these there may be mentioned the lead/lead-peroxide system utilizing acidic electrolytes, the zinc/silver-chloride systems using various salt electrolytes, and the rechargeable alkaline systems including the silver/zinc, silver/cadmium and nickel/cadmium systems. Of all those mentioned, the silver/cadmium system is to be preferred since, for all practical purposes, it is a gas-free system.

The framing and sealing members 12, 17, 17' are preferably fashioned from thermoplastic and/or thermosetting materials since these are easy to fabricate. The frames are best made by punching, molding, machining or vacuum forming although other methods may be used.

One of the two cover sheets 17, 17'' might also be omitted if the cavities 11 are not punched but are milled, molded or otherwise produced so as to be closed at the bottom.

The electrode assemblies including the separator, which may be presaturated with electrolyte, are positioned in the cavities 11 before sealing. Where it is desired to assemble the cells in dry form, filling holes 18 are utilized. The assembled cells are in such case placed in a vacuum chamber and all the air from the interior of the cells is pumped out through holes 18. The vacuum container is then flooded with the liquid electrolyte which seeps through the holes 18 into the cell cavities. When sufficient electrolyte is deemed to have been absorbed, the outsides of the battery strip are washed and the filling holes 18 are sealed with cement or fused by heat.

Under certain conditions it is possible to use a gelled or non-liquid electrolyte. The gelled electrolytes are common electrolytes to which there have been added certain agents adapted to increase the viscosity of the solution to the point where it will not be fluid at room temperature. Solid electrolytes, such as ion-exchange resins, may also be used.

The interelectrode separators 16 may consist of one or more semi-permeable sheet materials, such as paper, regenerated cellulose, methyl cellulose and polyvinyl alcohol.

FIG. 2 illustrates an industrial electrode 14, which may be either of the two electrodes 14' and 14'' of a cell 13, wrapped in a separator 16 prior to introduction into the cell cavity. The electrode 14 is centered in a flattened tube of separator material formed by overlapping the ends of the sheet 16. The extremities 16a, 16b of the separator tube extending beyond the electrode are then folded over the electrode with lead 15'' projecting from the free end 16a of the wrap.

Figure 3:
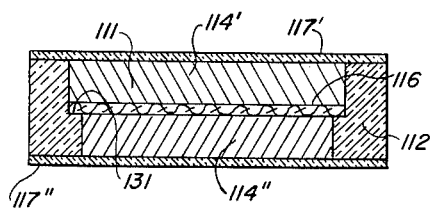
FIG. 3 is a cross-sectional view of a modified assembly similar to that of FIG. 1.

FIG. 3 details a section of a modified battery strip 112 wherein each electrode cavity 111 is formed with a step-like peripheral ledge 131. This ledge 131 serves as a seating surface for the inter-electrode separator 116 which is pressed against this surface by one electrode 114'. The other electrode 114'' presses against the lower face of the separator. The entire electrode assembly is held in place within the cavity by sealing strips 117' and 117''.

Figure 4:
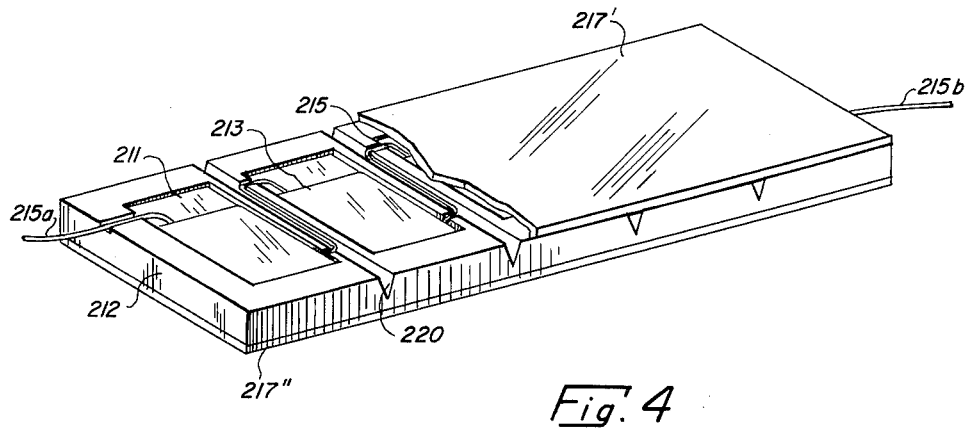
FIG. 4 is a perspective view of another embodiment of this invention.

FIG. 4 shows another embodiment of this invention in which a framing strip 212 has cavities 211 containing cell assemblies 213, said cavities being closed by sealing strips 217' and 217''. The framing strip 212 is provided with transverse notches 220 extending parallel to the long axis of each of the cells 213 and penetrating sufficiently far through the thickness of the framing strip to permit easy deformation of the strip in order to fit contoured surfaces. Cover sheet 217' may, if elastic, be left intact at the locations where it spans the broad ends of the wedge-shaped notches 220. If this sheet is not sufficiently elastic it may also be notched or cut if deformation is necessary. The individual cells 213 are shown serially interconnected by means of S-shaped leads 215 tightly imbedded in recesses underneath sheet 217' so as to prevent electrolyte leakage between cells. In order to assure sufficient sealing surface, the lead 215 may be flattened in those areas where it passes between the frame 212 and the sealing sheet 217'. The external conductors of the battery emerge at 215a, 215b from the strip 212.

Figure 5:
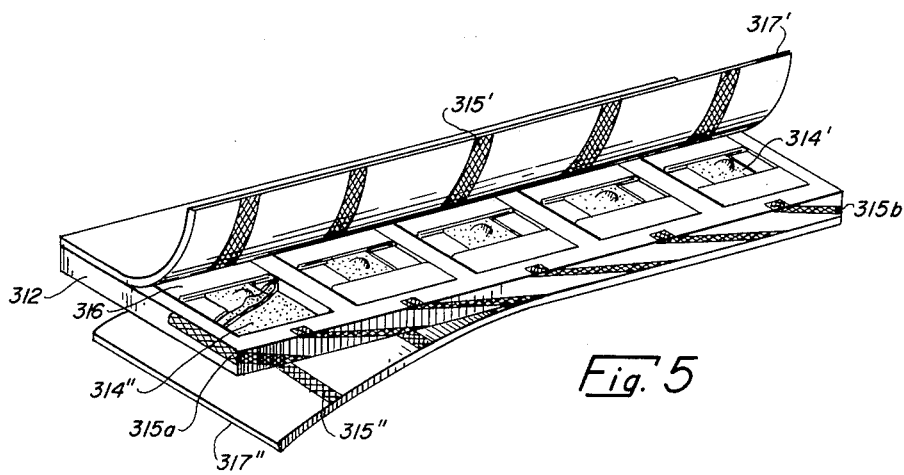
FIG. 5 is a perspective view of a further battery assembly according to this invention.
Figure 6:
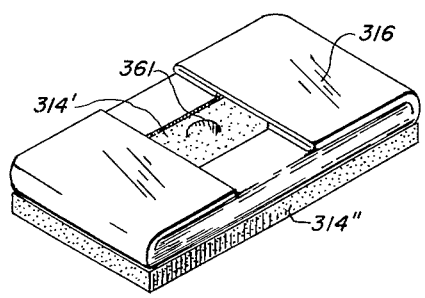
FIG. 6 is a perspective view of an electrode package forming part of the embodiment of FIG. 5.

FIGS. 5 and 6 represent a further embodiment of this invention wherein the electrode leads 315' and 315'' are applied by printed-circuit techniques to the sealing sheets 317' and 317'' bonded to the exterior of the battery strip 312. Inter-cell connections 315' and external leads 315a, 315b are similarly printed on the frame 312. The lower electrode 314'', which may be the negative one, is bare and therefore makes direct contact with its lead 315''. The wrapped upper (e.g. positive) electrode 314' has its enveloping separator 316 foreshortened to expose a protuberance 361 on its top surface which engages the associated lead 315' when the sheet 317' is applied.

The framing strip and its covers may be of the same or dissimilar materials. Among thermoplastic resins suitable for the molding and punching processes, there may be mentioned polyethylene, polypropylene, polystyrene, nylon and the acrylic resins. The polyolefins mentioned above are to be preferred if the temperature of use is not too high (below 80° C.) since they are inexpensive and heat-sealable. Frames and cover sheets made therefrom are easily fused to one another to form a unitary structure.

Other resins are easily joined by means of conventional adhesives, e.g. glacial acetic acid.

Among the thermosetting resins, the condensed alkyds are useful for alkaline solutions and phenol-formaldehyde, urea-melamine or urea-formaldehyde resins may be used for the neutral or acid electrolytes.

I claim:

1. A battery assembly comprising a substantially flat, non-conductive body provided with a plurality of juxtaposed cavities and a plurality of electrochemical cells respectively disposed in said cavities, said cavities opening toward at least one major surface of said body, each of said cells consisting essentially of a reversible electrochemical couple having a positive and a negative electrode, an electrolyte impregnated inter-electrode separator means encompassing at least one of said electrodes, cover means on said surface overlying all of said cavities sealing said cells therewith and inter-cell conductor means connected to said electrodes and extending between said cavities, said reversible electrochemical couples being selected from the group consisting of lead/lead peroxide, zinc/silver chloride, silver/zinc, silver/cadmium and nickel/cadmium.

2. A battery assembly according to claim 1 wherein the inter-electrode separator encompasses the positive electrode.

3. A battery assembly according to claim 1 wherein said conductor means extends underneath said cover means.

4. A battery assembly according to claim 3 wherein said body is provided with channels between said cavities, said conductor means extending within said channels.

5. A battery assembly according to claim 1 wherein said body is scored at locations between said cavities in a manner enabling said body to be flexed.

6. A battery assembly according to claim 1 wherein said conductor means includes printed circuitry on said cover means.

7. A battery assembly according to claim 1 wherein said separator means comprises a wrapper enveloping one of said electrodes while leaving a portion thereof exposed, said exposed portion being provided with a protuberance, said conductor means including a strip on the inner surface of one of said covers in contact with said protuberance.

8. A battery assembly according to claim 7 wherein said conductor means further includes a strip on the inside of the other of said covers in contact with the other electrode.

9. A battery according to claim 1 wherein said electrodes constitute a silver/zinc system.

10. A battery according to claim 1 wherein said electrodes constitute a silver/cadmium system.

11. A battery according to claim 1 wherein said electrodes constitute a nickel/cadmium system.

12. A battery according to claim 1 wherein said electrodes and electrolyte consist essentially of a zinc/silver chloride salt electrolyte system.

References Cited in the file of this patent

UNITED STATES PATENTS

| | | |
|---|---|---|
| 2,418,442 | Wiencke | Apr. 1, 1947 |
| 2,547,262 | Greenstein | Apr. 3, 1951 |
| 2,575,337 | Ellis | Nov. 20, 1951 |
| 2,580,415 | Ellis | Jan. 1, 1952 |
| 2,798,895 | Nowotny | July 9, 1957 |
| 2,831,046 | Linton | Apr. 15, 1958 |
| 2,843,649 | Louis | July 15, 1958 |
| 2,844,641 | Lang et al. | July 22, 1958 |
| 2,847,495 | Nagorski | Aug. 12, 1958 |
| 2,848,526 | Franquemont | Aug. 19, 1958 |
| 2,851,509 | Di Pasquale | Sept. 9, 1958 |
| 2,861,117 | Sindel | Nov. 18, 1958 |
| 2,870,235 | Soltis | Jan. 20, 1959 |
| 2,966,538 | Bernot | Dec. 27, 1960 |

OTHER REFERENCES

Vilkomerson "Rejuvenating Dry Batteries," Radio-Craft, July 1941, pages 51–54.